United States Patent [19]
Walters et al.

[11] Patent Number: 5,722,222
[45] Date of Patent: Mar. 3, 1998

[54] CENTER-PIVOT MOWER-CONDITIONER DRIVE

[75] Inventors: James C. Walters; Roger Dale Stephenson; Stephen Kenneth Parsons, all of Ottumwa; Allan Wesley Rosenbalm, Blakesburg, all of Iowa

[73] Assignee: Deere & Company, Moline, Ill.

[21] Appl. No.: 694,085

[22] Filed: Aug. 8, 1996

[51] Int. Cl.$^6$ .............................. A01D 34/66; A01D 34/76
[52] U.S. Cl. .............................................. 56/6; 56/16.4 B
[58] Field of Search ................................ 56/1, 6, 16.4 A, 56/16.4 B, 16.4 C

[56] References Cited

U.S. PATENT DOCUMENTS

| | | | |
|---|---|---|---|
| 3,747,310 | 7/1973 | Calder | 56/16.4 A |
| 5,076,042 | 12/1991 | Koorn et al. | 56/6 |
| 5,094,063 | 3/1992 | Wattron et al. | 56/6 |
| 5,430,997 | 7/1995 | O'Halloran et al. | 56/6 |
| 5,463,852 | 11/1995 | O'Halloran et al. | 56/6 |

*Primary Examiner*—Terry Lee Melius

[57] ABSTRACT

A drive for a center-pivot mower-conditioner includes a power shaft supported within the center-pivot tongue and ending in an equal-angle drive section which intersects the vertical axis of the connection of the tongue with the center of a transverse beam forming part of a main frame of the mower-conditioner when the tongue is in a straight ahead position. A multiple v-belt drive transfers rotation of the tongue-carried drive-line to a substantially horizontal, fore-and-aft extending main header drive shaft located just leftwardly of the transverse beam of the main frame. The main header drive shaft is coupled to a first header drive box containing right-angle gearing for directing power to a downwardly extending through shaft extending through a second header gear box to a left-most cutting unit of a rotary cutterbar extending transversely across a header suspended for floating over undulating terrain during cutting operation. The second header gear box contains gearing for driving a multiple groove, v-belt drive pulley mounted to an output shaft projecting leftwardly from the second header gear box, the drive pulley forming part of a multiple v-belt drive coupled to a third header gear box containing intermeshed spur gears coupled for counter-rotating upper and lower conditioner rolls extending transversely behind the rotary cutterbar. In a second embodiment, the drive pulley is mounted to a shaft projecting rightwardly from the second header gear box and forming part of a multiple v-belt drive coupled for driving a rotary impeller conditioner extending transversely behind the rotary cutterbar. In a third embodiment, the second header gear box is eliminated and the rotary impeller conditioner is driven from the first gear box through a v-belt drive including a v-belt pulley mounted to a shaft projecting rightwardly from the first gear box.

13 Claims, 7 Drawing Sheets

CENTER-PIVOT MOWER-CONDITIONER DRIVE

BACKGROUND OF THE INVENTION

The present invention relates to drives for mower-conditioners and more specifically relates to drives for center-pivot mower conditioners.

Center-pivot mower-conditioners normally comprise a wheel-supported, transversely extending main frame from which a header or platform is suspended for floating over the ground during mowing operation. The mower-conditioner includes a draft tongue which extends over the header and is pivotally attached to a location midway between opposite ends of the main frame for swinging from side-to-side so as to permit the header to cut a swath of crop at either side of the towing tractor.

Heretofore, crop harvesting and conditioning components of a header equipped with a sickle bar for severing crop have typically been driven by a hydrostatic pump/motor system to transfer power from the tractor power take-off (PTO) to the header. Headers equipped with a rotary cutterbar consume much more power than those equipped with a sickle bar and cannot be efficiently powered by a PTO driven hydrostatic system. The high power requirement of these headers is met by using a drive system including a train of drive elements coupled directly to the tractor PTO shaft for distributing power to the rotary cutterbar and crop conditioning components of the header. U.S. Pat. No. 5,463,852 which issued on Nov. 7, 1995 discloses a drive system of the latter type.

The aforementioned patented drive structure has the disadvantage that the drive components for transferring power from a tongue-supported drive line to input shafts at the end of the rotary cutterbar are located so as to be difficult to access since they extend above a central fore-and-aft zone of the header. Furthermore, the patented drive system has no provision for driving crop conditioning components.

SUMMARY OF THE INVENTION

According to the present invention there is provided an improved drive system for a center-pivot mower-conditioner and more specifically there is provided a drive system for conveying power from a tractor power take-off shaft to various driven components of the mower-conditioner.

A broad object of the invention is to provide a drive system having driveline elements constructed for accommodating changes in power distribution direction due to articulation between the tractor and mower-conditioner or floating motion of the header relative to the mower-conditioner main frame without subjecting the driveline to prohibitive loading.

Another object of the invention is to provide a drive system including a belt drive for transferring power from the center to the left-hand side of the mower-conditioner, the belt drive being located at the rear of the machine for easy access.

Yet another object of the invention is to provide a drive system including a main header drive line extending fore-and-aft between a belt-driven shaft rotatably mounted to the mower-conditioner main frame at a location beside the left-hand end of a transverse beam of the main frame and an input shaft to a first header gear box mounted to the mower-conditioner header, with the header drive line being substantially horizontal during cutting operation.

A further object of the invention is to provide a drive system which may be easily configured for driving either an impeller conditioner or a roll conditioner of the header.

Still another object of the invention is to provide a drive system which contains an over-running clutch for the purpose of eliminating negative torque spikes resulting from the flywheel effect of the rotating driven elements when power is discontinued to the tractor power take-off.

These and other objects will become apparent from a reading of the following description together with the appended drawings.

DESCRIPTION OF THE PREFERRED EMBODIMENT

Preliminarily, it should be noted that, while components are often described as occurring in pairs, only one of the pair might be illustrated with it to be understood that the missing component is the same as or the mirror image of the one shown.

Figure 1:
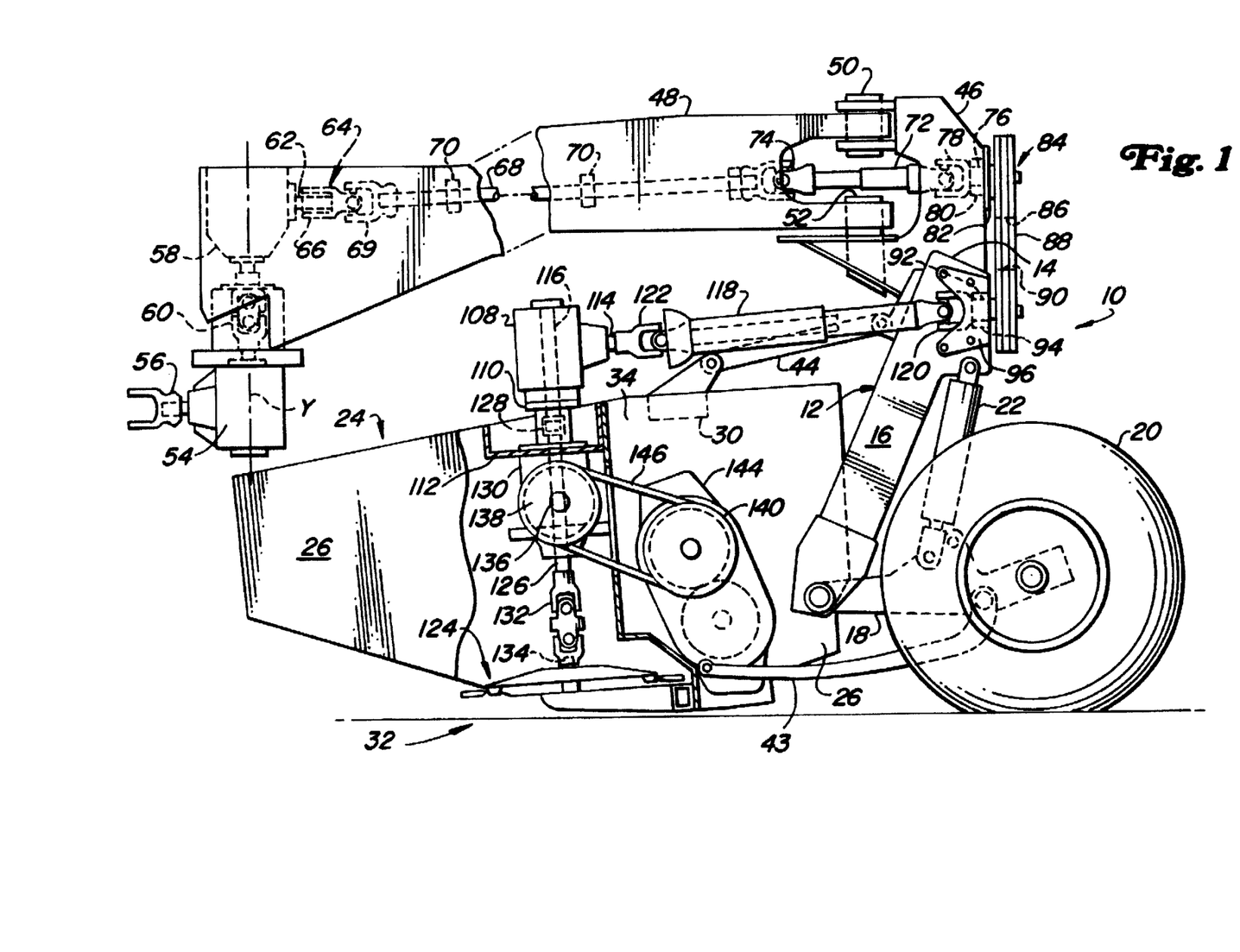
FIG. 1 is a somewhat schematic left-side elevational view showing a center-pivot mower-conditioner equipped with a rotary cutterbar and roll conditioner and embodying a drive system constructed in accordance with the present invention. and with parts being broken away for clarity.
Figure 2:
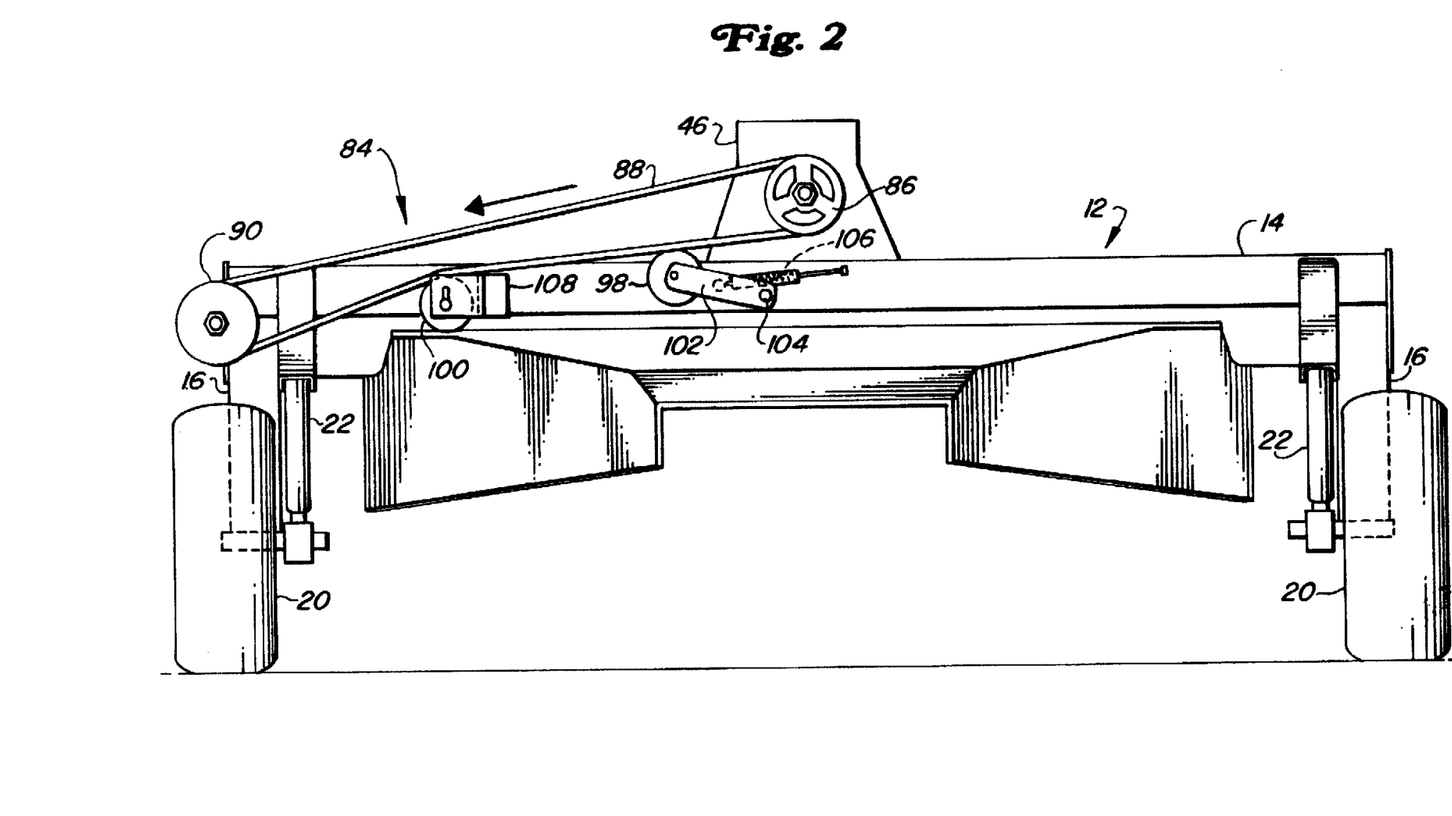
FIG. 2 is a partial rear elevational view of the mower-conditioner shown in FIG. 1 showing the drive elements for transferring power from the center to the left-hand side of the mower-conditioner.

Referring now to FIGS. 1 and 2, there is shown a center-pivot mower-conditioner 10 including a main frame 12 comprising a transverse, tubular beam 14 having wheel support legs 16 depending from its opposite ends. A pair of wheel support arms 18 have forward ends respectively vertically pivotally connected to the legs 16, and rotatably mounted to a rear end of each arm 18 is a ground wheel 20. Connected between each arm 18 and the beam 14 is a two-way hydraulic cylinder 22 that is operable for raising and lowering the frame 12 relative to the ground.

Figure 3:
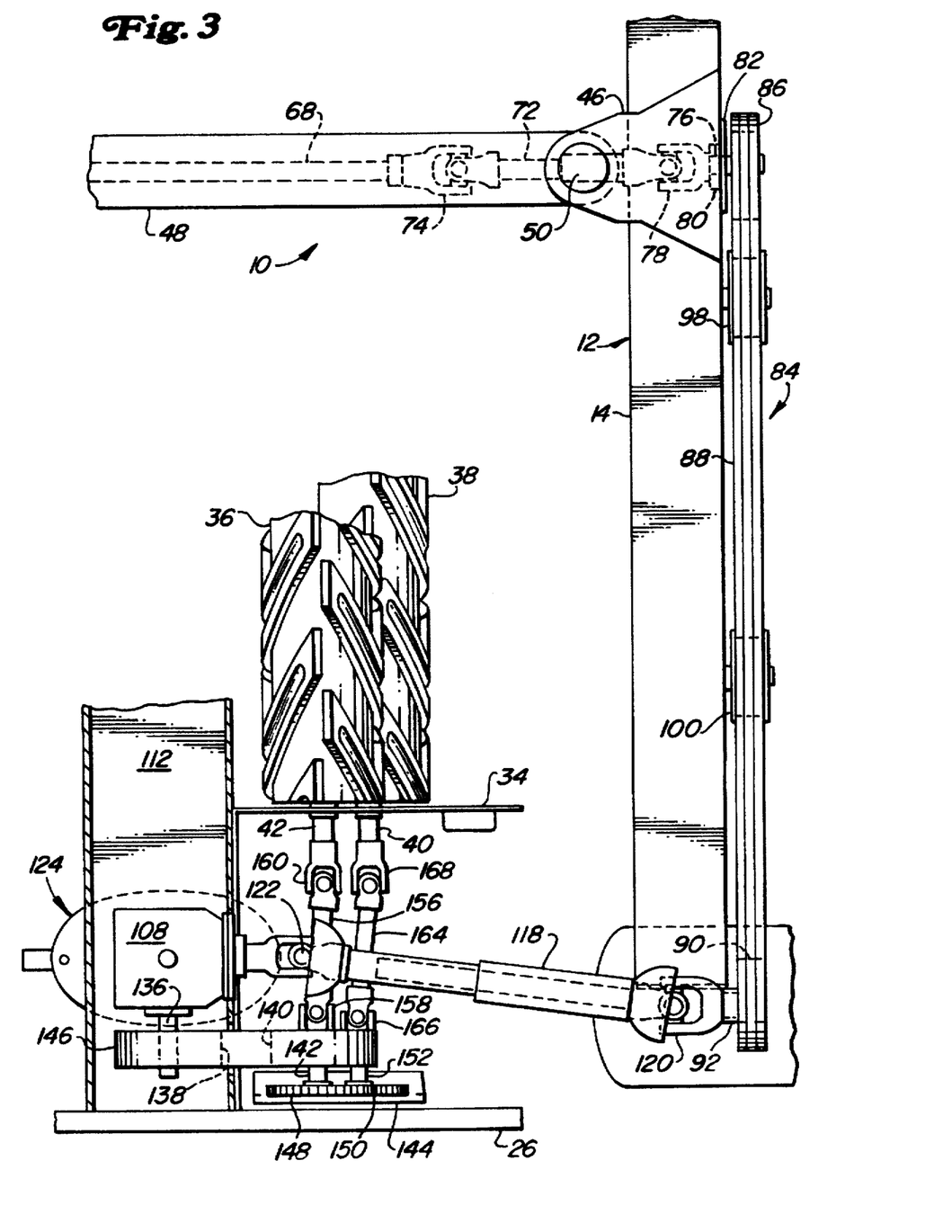
FIG. 3 is a partial top plan view of the mower-conditioner shown in FIG. 1 showing the drive elements for distributing power between the rotary cutterbar and the conditioner rolls.

Positioned forwardly of and suspended from the frame 12 is a header or platform 24 including opposite sidewalls 26 interconnected by frame members including an upper central cross member 30 and a rotary cutterbar 32 extending between and joining a lower intermediate location of the sidewalls. Referring now also to FIG. 3, it can be seen that spaced rearwardly of the cutterbar 32 between vertical walls 34, which define a rearwardly extending crop passage, are upper and lower conditioner rolls 36 and 38, respectively. Opposite ends of the lower roll 38 are respectively defined by a pair of stub shafts 40 that are rotatably received in respective bearings mounted to the walls 34, while opposite ends of the upper roll 36 are similarly defined by a pair of stub shafts 42 that project through vertically elongated openings (not shown) in the walls 34 and are rotatably mounted in bearings carried by a pair of arms (not shown) respectively mounted to the wall 34 in the vicinity of the roll opposite ends for permitting the upper roll 36 to move toward and away from the lower roll 38. The header 24 is suspended from the frame 12 by a pair of lower links 43, each having a rear end pivotally coupled to a respective one of the wheel support arms 18 and having a forward end pivotally coupled to a lower location of the header 24 just rearwardly of the cutterbar 32; and located approximately centrally is an upper link 44 having its opposite ends respectively pivotally coupled to the cross member 30 and to an upright post or mast structure 46 joined to the beam 14 at a location midway between its opposite ends. An elongate, straight tubular tongue 48 extends over the header 24 and is attached for horizontal pivotal movement, as by upper and lower axially aligned pivot pins 50 and 52, respectively, to the upright mast structure 46. A forward end of the of the tongue 48 is adapted for attachment to a swivel hitch structure (not shown) which in turn is adapted for being attached to vertically swingable arms of a hitch system of a towing tractor (not shown).

Power for driving the rotary cutterbar 32 and conditioner rolls 36 and 38 of the mower-conditioner 10 is supplied at a power take-off shaft (not shown) of the towing tractor. Thus, provided at the forward end of the tongue 48 for attachment to the tractor power take-off shaft, as by a telescopic coupling shaft (not shown) is a first right-angle gear box 54 mounted for rotation about an upright axis Y and including a forwardly projecting input shaft 56 adapted for connection to the rear end of the telescopic coupling shaft, the latter having a forward end defined by a u-joint coupler splined yoke adapted for connection to a splined end of the tractor power take-off shaft. Located along the axis Y in alignment with an upright output shaft of the first gear box 54 is an input shaft of a second right-angle gear box 58 that is rigidly fixed to a forward end of the tongue 48. A short drive line 60 embodying two u-joints interconnects the output shaft of the first gear box 54 and an input shaft of the second gear box 58. The second gear box 58 has a rearwardly directed output shaft 62 disposed at a right angle to the axis Y having a splined connection to an input sleeve (not shown) of an over-running or one-way clutch 64, the sleeve being received within a cylindrical receptacle 66 forming a portion of an output of the clutch and being coupled thereto for transferring drive torque thereto, only when rotated in the forward direction, by means of pawls carried in recesses in the exterior of the input sleeve and engaged with an annular set of internal ratchet surfaces formed in the interior of the receptacle 66. The receptacle 66 is integral with a yoke that is pinned to a similar yoke coupled to a forward end of a tongue-mounted drive shaft 68, so as to define a u-joint 69. The drive shaft 68 is located within and extends substantially the entire length of the tongue 48. The over-running clutch 64 prevents negative torque spikes from developing in the mower-conditioner driveline. In addition, the clutch 64 permits driveline components upstream of the clutch to be freely rotated manually in reverse thus permitting a splined yoke at the forward end of the telescopic coupling shaft (not shown) extending between the gear box input shaft 56 and the tractor PTO to be indexed with splines provided on the tractor power take-off shaft when hooking the coupling shaft to the tractor PTO. Spaced along and rotatably supporting the drive shaft 68 is a plurality of bearings 70, it being noted that the drive shaft 68 and bearings 70 are subassembled, slid into the tube forming the tongue 48 and then bolted in place. It will be appreciated that the tongue tube then serves as shielding as well as support for the drive shaft 68.

A telescopic, equal-angle drive shaft 72 has front and rear u-joint yokes respectively pinned to a yoke at the rear end of the drive shaft 68, to define a u-joint 74, and pinned to a yoke at the forward end of a drive pulley support stub shaft 76 to define a u-joint 78. The shaft 72 intersects the axis defined by the tongue coupling pins 50 and 52 when the tongue 48 is in a straight ahead position. The stub shaft 76 extends through and is rotatably mounted in a bearing contained in a cylindrical bearing housing 80 fixed to a nearly vertical wall 82 of the upright mast structure 46. The pair of u-joint yokes respectively at the rear end of the driveline 68 and at the front end of the stub shaft 76 are spaced equi-distant from the tongue pivot axis so as to allow the tongue 48 to be positioned and operated about 45° to either side of its straight ahead position. It also allows the tongue 48 to be positioned, when the drive is not being operated, about 90° to either side of its straight ahead position to ready the mower-conditioner 10 for transport when parked on a wheeled transport trailer.

For the purpose of transferring power from the equal-angle drive shaft 72 to the driven components carried by the header 24, a main belt drive 84 is provided. Specifically, the belt drive 84 includes a first multiple groove v-belt drive pulley 86 mounted on the stub shaft 76 and coupled, as by a plurality of belts 88, to a multiple groove v-belt driven pulley 90 mounted to a stub shaft 92 extending through and rotatably mounted in a bearing contained in a cylindrical bearing housing 94 carried by a bracket 96 fixed to an upper leftward surface of the wheel support leg 16. The belt drive 84 includes a first idler pulley 98 engaged with a lower run of the belts 88 at a location a short distance leftwardly of the drive pulley 86 and a second idler pulley 100 engaged with the lower run of the belts 88 at a location slightly toward the pulley 90 from a midpoint of the run between the pulleys 86 and 90. Specifically, the idler pulley 98 is mounted to one end of an arm 102 pivotally mounted to the beam 14, as at a pin 104, and is biased into engagement with the belts 88 by a spring 106 coupled between the arm 102 and the beam 14. The idler pulley 100 is vertically adjustably mounted to a bracket 108 fixed to the beam 14.

While the belt drive 84 is preferred because of its simplicity and relatively low cost for transmitting power transversely from the center to the side of the frame 12, it will be appreciated that other drive means could be used for transverse power transmission. For example, first and second right-angle gear boxes could be mounted to the frame 12 with the input shaft of the first gear box being positioned similarly to the stub shaft 76 and with the output shaft of the second gear box being positioned similarly to the stub shaft 92. A coupling shaft would join the output shaft of the first gear box to the input shaft of the second gear box. A first header gear box 108 has a bottom bolted to the top end of a tubular support housing 110 having a bottom end bolted to an upper horizontal surface of a transversely extending header frame member 112. As can best be seen in FIG. 1, the gear box 108 is a right angle gear box having an input shaft 114 disposed at a right angle to an output shaft 116 with bevel gearing (not shown) coupling the shaft 116 for being driven from the shaft 114. Power is delivered to the gear box 108 by a telescopic platform drive coupling shaft 118 having its rear end coupled, as by a u-joint 120, to a forward end of the driven belt pulley support stub shaft 92 and having its forward end coupled, as by a u-joint 122, to the gear box input shaft 114.

It will be appreciated that, by being telescopic, the coupling shaft 118 accommodates for the changing relationship of the header 24 to the main frame 12 resulting from the header (a) floating over uneven ground, (b) being raised or lowered, (c) being tilted to change the cutterbar angle or (d) having its height of cut changed by adjusting the header gage shoes. Furthermore, in order to minimize the effect of drive line thrust on header flotation, the coupling shaft 118 is kept as horizontal as possible, this disposition being made possible by the fact that the shaft 118 is located beyond the end of the frame member 14 so that its rear end does not have to be at a height sufficient to pass over the frame member.

The output shaft 116 is aligned with an axis of rotation of a left end cutting unit 124 of the rotary cutterbar 32. A through-shaft 126 has an upper end received in the housing 110 and coupled to the output shaft 116 by a coupling sleeve 128, the shaft 126 extending through a second header gear box 130 and having its lower end coupled, as by a double cardan joint 132, to an upper end of a cutterbar input shaft 134 forming part of the cutting unit 124. It is here noted that, as viewed from above, the shaft 126 is rotated clockwise so that crop cut by the cutter unit 124 is swept inwardly.

Figure 4:
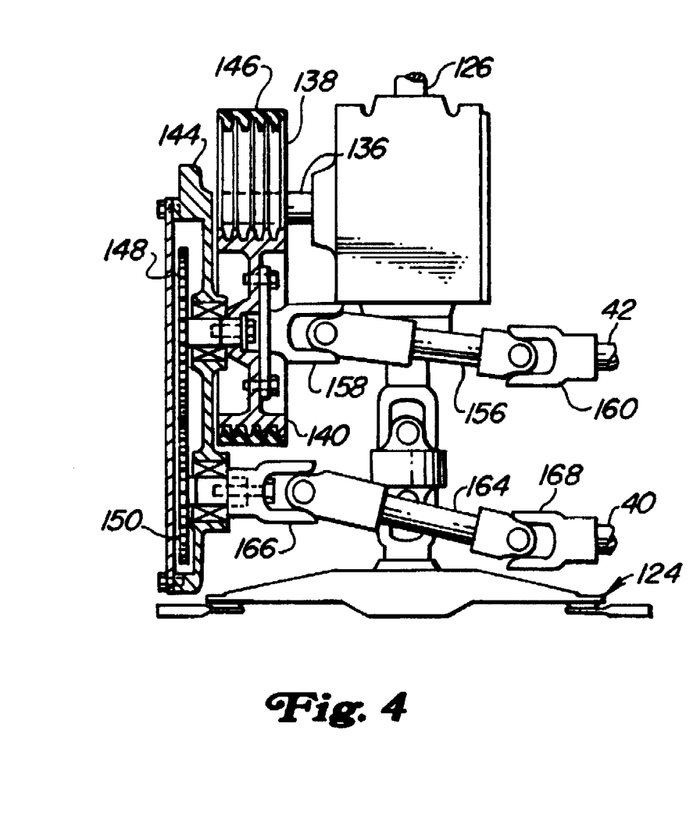
FIG. 4 is a rear elevational view of the drive train extending between the second header gear box and the conditioner rolls when no slip clutch is embodied in the drive train.

The speed of rotation of the shaft 126 is relatively fast, e.g., 2650 r.p.m. in the preferred embodiment. A speed reducing bevel gear set (not shown) is connected between the through-shaft 126 and a leftwardly projecting output shaft 136 and causes the output shaft 136 to rotate at about one-third the speed of the through-shaft 126, e.g., 735 r.p.m. in the preferred embodiment. The output shaft 136 has a multiple grooved v-belt drive pulley 138 mounted thereon; and spaced rearwardly of and being in fore-and-aft alignment with the pulley 138 is a similar multiple grooved v-belt driven pulley 140 mounted to an input shaft 142 extending into a conditioner roll drive gear case 144 that is bolted to an inner surface of the left-hand sidewall 26. A v-ribbed belt 146 is trained about the pulleys 138 and 140. Located in the gear case 144 and mounted on the shaft 142 is an upper spur gear 148 that is meshed with a similar sized lower spur gear 150 mounted on a shaft 152 projecting rightwardly from the gear case. The leftwardly projecting stub shaft 42 of the upper conditioner roll 36 is coupled for being driven from the input shaft 142 by a telescopic upper conditioner roll drive shaft 156 having its leftward end connected to the input shaft 142 by a u-joint 158 and having its rightward end connected to the stub shaft 42 by a u-joint 160. The leftwardly projecting stub shaft 40 of the lower conditioner roll 38 is coupled for being driven from the shaft 152 by a telescopic lower conditioner roll drive shaft 164 having its leftward end connected to the shaft 152 by a u-joint 166 and its rightward end connected to the lower conditioner roll stub shaft 40 by a u-joint 168.

It is noted that each of the cutting units of the rotary cutterbar 32 embodies a shear device (not shown) which shears when an overload is experienced by the cutting unit. Thus, there is no need for embodying a slip clutch in the relatively fast rotating drive train for the rotary cutter units, the use of such a slip clutch being undesirable in any event since it would generate heat very rapidly.

Figure 5:
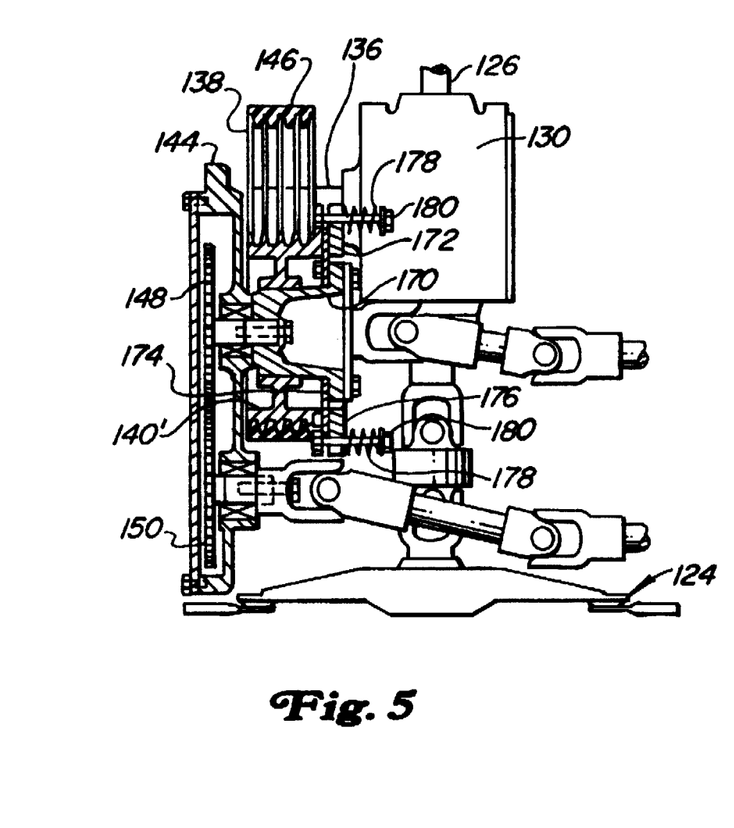
FIG. 5 is a view like FIG. 4 but showing a slip clutch embodied in the drive train.

It is not thought necessary to provide a slip clutch in the drive to the conditioner rolls. However, if such a slip clutch is desired, it may be placed in the drive line at the driven pulley coupled to the input shaft 142 of the third header gear case 144. Specifically, with reference to FIG. 5, it can be seen that a central hub structure 170 is secured to the shaft 142 and forms a cylindrical surface on which a multiple grooved driven v-belt pulley 140' is mounted for free rotation. The pulley 140' includes a rightwardly facing, annular clutch surface 172. Mounted for rotation with the hub structure 170 in engagement with the surface 172 is an annular clutch disc 174. An annular pressure plate 176 is mounted at the opposite side of the clutch disc 174 from the surface 172, with the clutch disc 174 being clamped between the surface 172 and pressure plate 176 by a plurality of compression springs 178 mounted on respective bolts 180 extending between the pulley 140'and the pressure plate 176. Thus, it will be apparent that so long as the rotational resistance of the conditioner rolls 36 and 38 remains below that which will overcome the clamping force exerted by the springs 178, the pulley 140', clutch disc 174, pressure plate 176 and hub structure 170 will rotate as a unit. However, should an unusual load be encountered by the conditioner rolls 36 and 38 which overcomes the clamping force of the springs 178, the pulley 140' will rotate or slip relative to the clutch disc 174 until the overload is removed.

Figure 6:
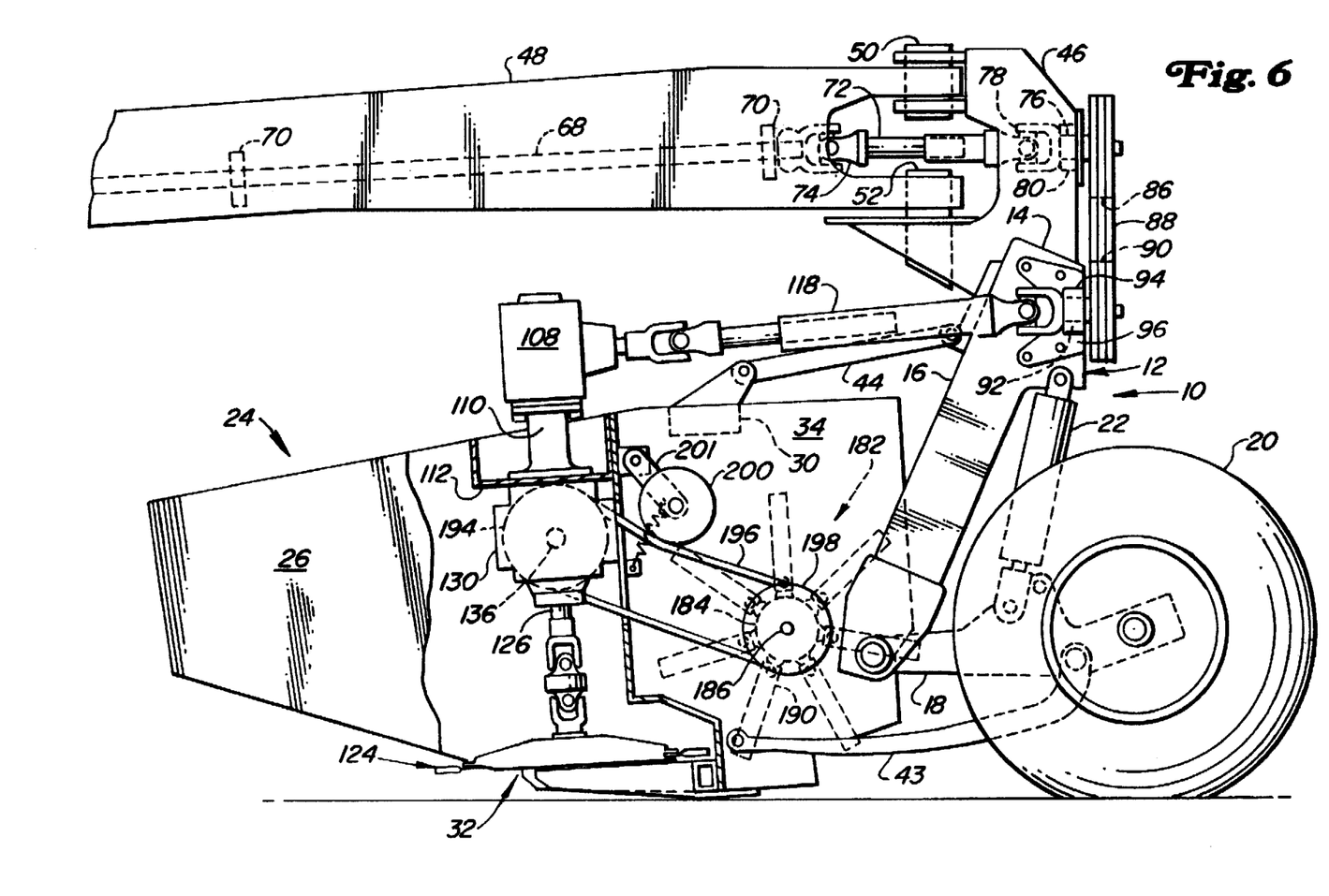
FIG. 6 is a left side elevational view like FIG. 1 but showing an impeller conditioner.

Referring now to FIG. 6, there is shown a header 24' embodying a rotary impeller conditioner 182 mounted between the walls 34 instead of a roll conditioner, as described above. Specifically, the impeller conditioner 182 includes a drum 184 extending horizontally and transversely from the right-hand wall 34 and through the left-hand wall 34. Stub mounting shafts 186 project from opposite ends of the drum 184 with the right-hand mounting shaft 186 being rotatably mounted to the right-hand wall 34 and with the left-hand mounting shaft 186 being rotatably mounted to a support 188 fixed to the left-hand wall 34. Mounted along the drum 184 are a plurality of conditioner elements 190.

Figure 7:
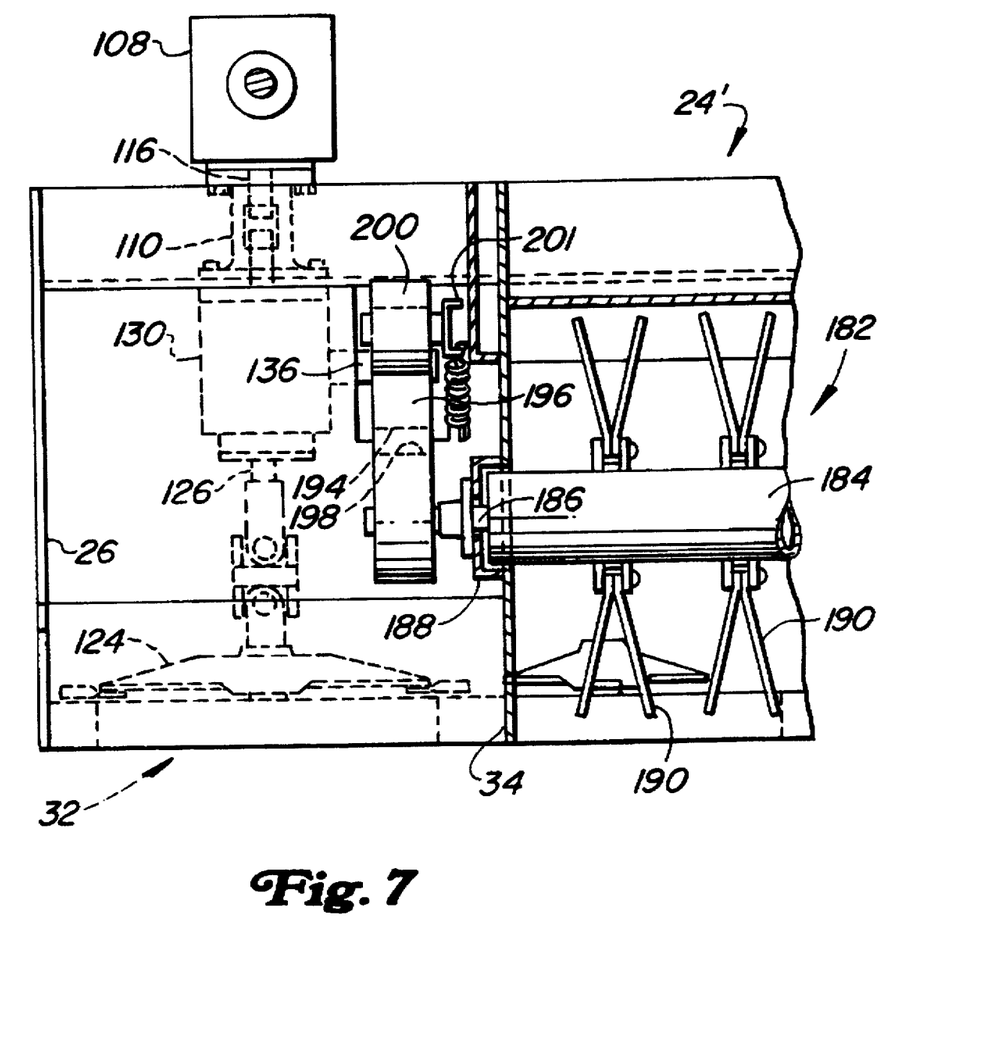
FIG. 7 is a rear elevational view of a portion of the drive of FIG. 6 showing 15 the drive train extending between the second header gear box and the impeller conditioner.

The drive for the impeller conditioner 182 is similar to that used for driving the roll conditioner and, for the sake of brevity, only those portions of the drive which are different are described in detail, with those drive components which are identical to those described above being given the same reference numerals. However, it is first to be noted that the gear box 130 is the same as that described above except that it has been rotated 180° so that its output shaft 136 now projects rightwardly with its direction of rotation being reversed so that it drives the impeller conditioner 182 in the clockwise direction, as viewed in FIG. 6. Specifically, mounted to the output shaft 136 is a multiple groove, v-belt drive pulley 194 that is coupled, as by a v-ribbed belt 196, for driving a multiple groove, v-belt driven pulley 198 that is mounted to the leftwardly projecting, impeller stub shaft 186. An idler pulley 200 is mounted to an arm 201 that is pivotally mounted to the bulkhead behind the gear box 130 and downwardly spring-loaded for keeping the pulley 200 engaged with a top or slack run of the belt 196. It is noted that the pulleys 194 and 198 are of different diameter and may be switched or replaced with pulleys of different sizes in order to change the speed of rotation of the impeller conditioner 182 so as to enhance the conditioning for varying crops and harvest conditions.

Figure 8:
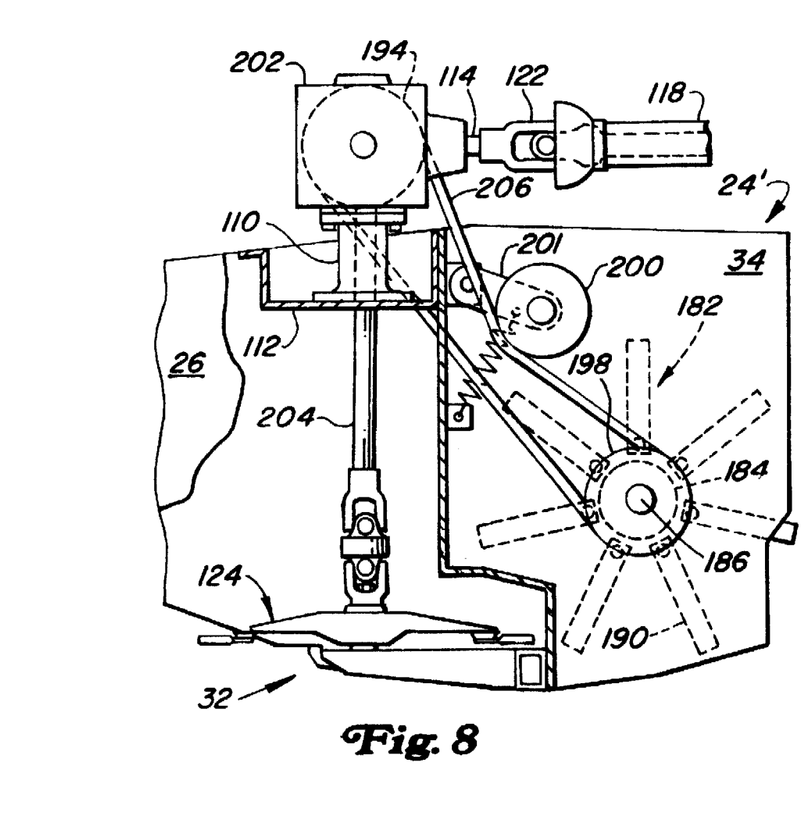
FIG. 8 is a left side elevational view like FIG. 6 but showing an alternate embodiment wherein a single gear box is used for driving both the rotary cutterbar and the impeller conditioner.
Figure 9:
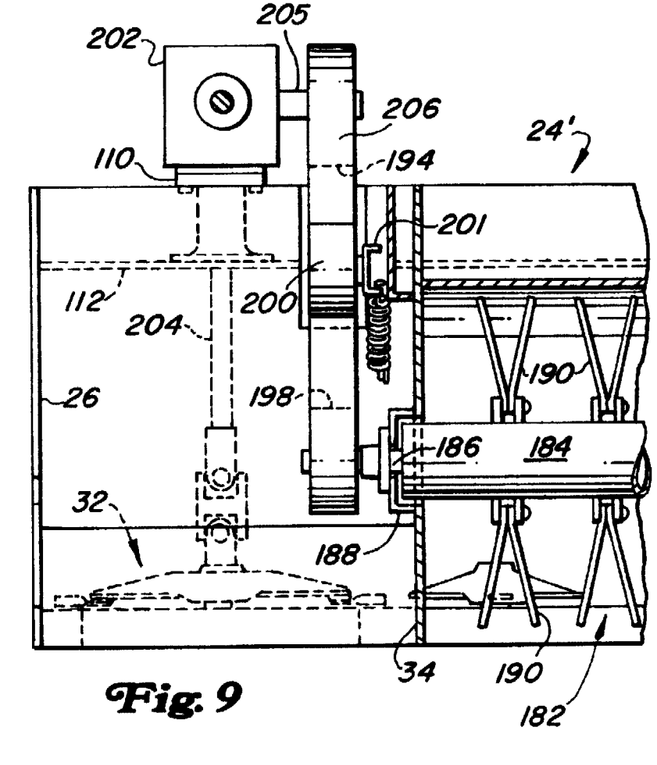
FIG. 9 is a rear elevational view showing that portion of the drive of FIG. 8 including the single gear box and its connection with the impeller conditioner.

Referring now to FIGS. 8 and 9, there is shown an alternate embodiment of the drive for the impeller conditioner 182 wherein the first header gear box 108 is replaced by the second header gear box 202 and the second header gear box 130 is eliminated. A through shaft 204 is mounted in a first header gear box 202 and replaces both the downwardly projecting output shaft 116 and the through shaft 126. An output shaft 205 extends rightwardly from the gear box 202 and has the drive pulley 194 mounted thereon and coupled to the driven pulley 198 by a v-ribbed belt 206. The position of the belts 206 differs from the previously described belts 196, however, the location of the mounting of the idler pulley 200 remains the same as it positions the pulley 200 it biased engagement with an upper run of the belts 206.

The operation of the drive system for the driven components of the header or platform 24 is thought evident from the foregoing. Suffice it to say that the primary features of the drive system is the manner of transferring power from the center of the frame 12 to the platform 24, this being done by the belt drive 84 and platform drive shaft 118, with the driven pulley 90 of the belt drive 84 being located beyond and at a level commensurate with that of the top of the transverse frame member 14 in order that the platform drive shaft 118 be disposed approximately horizontal when the platform is in a working position, this attitude of the shaft 118 minimizing operating stresses at the universal joints 120 and 122. A further feature of the drive system is the slip clutch 64 which not only prevents the transmission of negative torque spikes forwardly beyond the clutch 64 but also acts to permit manual reverse rotation of the driveline components forwardly or upstream of the clutch 64 to facilitate indexing the splines at the forward end of a coupling shaft, extending between forwardly from the input shaft 56 of the swivel gear box 54, with the splines of a tractor power take-off.

We claim:

1. In a center-pivot mower-conditioner including a transversely extending mobile main frame, a header positioned in front of said main frame, a suspension means coupling the header to said main frame for floating vertically, an elongate tongue extending over said header and having a rear end coupled to said main frame for pivoting about an upright tongue pivot axis located halfway between opposite ends of said main frame, said header including a transversely extending rotary cutterbar including a plurality of side-by-side mounted cutting units driven from an upright input shaft spaced transversely in a first direction from a first location midway between opposite ends of said cutterbar, said header further including a crop conditioner including at least one driven, transversely extending conditioner element positioned rearwardly of said cutterbar and having a support shaft projecting in said first direction, and drive means coupled to said upright input shaft for driving said cutting units of said cutterbar and to said support shaft of said at least one driven conditioner element, the improvement comprising: said drive means including a first drive line section extending along and being supported by said tongue for rotation about a first axis intersecting said tongue pivot axis, with said first drive line section including a rear end terminating forwardly of said tongue pivot axis; a power transmission means for transferring drive torque from said first location midway between opposite ends of said main frame to a second location in general fore-and-aft alignment with said upright input shaft of said cutterbar; said power transmission means including first and second fore-and aft extending stub shafts respectively rotatably mounted to said main frame at said first and second locations; and power transfer means being coupled for transferring power from said first to said second stub shaft; said first stub shaft being rotatable about a first drive axis intersecting said tongue pivot axis and being in fore-and-aft alignment with said rear end of said first drive line section when said tongue is in a straight ahead position; an equal-angle drive line section; front and rear u-joints respectively coupling said equal-angle drive section to said first drive line section and said first stub shaft; a header first right-angle gear box mounted above said upright input shaft and in general fore-and-aft alignment with, and at approximately an even height with said second stub shaft; said header first right-angle gear box including a rearwardly located input shaft and a downwardly projecting output shaft; a telescopic main header drive line extending between and being universally connected to said second stub shaft and to said rearwardly located input shaft; and a cutterbar drive means and a conditioner drive means respectively coupling said downwardly projecting output shaft to said upright input shaft and to said at least one rotatable conditioning element.

2. The center-pivot mower-conditioner defined in claim 1 wherein said main frame includes a transverse member having opposite ends; and said second location being at one of said ends at a height less than that of said transverse member.

3. The center-pivot mower-conditioner defined in claim 1 wherein said power transfer means is a belt drive including drive and driven pulleys respectively mounted to said first and second stub shafts; and drive belt means being trained about said drive and driven pulleys.

4. The center-pivot mower-conditioner defined in claim 3 wherein said drive and driven pulleys are multiple v-belt pulleys and said drive belt means comprises a plurality of v-belts.

5. The center-pivot mower-conditioner defined in claim 1 wherein said power transfer means is located rearwardly of said main frame.

6. The center-pivot mower-conditioner defined in claim 5 wherein said power transfer means is a belt drive including drive and driven pulleys respectively mounted to said first and second stub shafts; and a drive belt means being trained about said drive and driven pulleys.

7. The center-pivot mower-conditioner defined in claim 6 wherein said main frame includes an elongate transverse member having opposite ends; an upright mast structure being joined to and extending upwardly from a location of said transverse member half-way between said opposite ends; said tongue pivot axis being defined in part by coupling structure carried by said mast structure and in part by coupling structure carried by a rear end of said tongue; said first stub shaft being rotatably mounted to said mast structure; said second stub shaft being rotatably mounted to and transversely outwardly of one end of said transverse member.

8. The center-pivot mower-conditioner defined in claim 1 wherein said first drive line section includes a one-way clutch means including an input member for transferring torque only when driven in a normal forward direction.

9. The center-pivot mower-conditioner defined in claim 1 wherein said tongue is straight and defines an elongate cavity having said first drive line section supported therein.

10. The center-pivot mower-conditioner defined in claim 1 wherein said at least one conditioner element is a rotary impeller conditioner including a rotor shaft means defined in part by said first support shaft; a multiple groove v-belt driven pulley being mounted to said first support shaft; and said cutterbar and conditioner drive means including a transverse output shaft projecting in a second direction from said first header gear box which is opposite from said first direction; a multiple groove v-belt drive pulley being mounted to said transverse output shaft in fore-and-aft alignment with said driven pulley; and v-belt drive means being trained about said drive and driven pulleys.

11. The center-pivot mower-conditioner defined in claim 1 wherein said cutterbar and conditioner drive means includes a second right-angle gear box located vertically below said first right-angle gear box; said second right-angle gear box having a through-shaft in axial alignment with and having an upper end coupled to said downwardly projecting output shaft of said first right-angle gear box and having a lower end coupled to said upright input shaft of said cutterbar; said second right-angle gear box having a transverse output shaft extending in a second direction opposite from said first direction; said at least one conditioner element being a rotary impeller conditioner including a rotor shaft means defined in part by said first support shaft; a multiple groove v-belt driven pulley being mounted to said first support shaft; a multiple groove v-belt drive pulley being mounted to said transverse output shaft of said second right-angle gear box; and v-belt means being trained about said drive and driven pulleys.

12. The center-pivot mower-conditioner defined in claim 1 wherein said at least one conditioner element is an upper conditioner roll including said first support shaft; a lower conditioner roll located below said upper conditioner roll and including a second support shaft disposed below and in parallel relationship to said first support shaft; a second header right-angle gear box mounted below said first header right-angle gear box and including a through-shaft extending between and being coupled to said downwardly projecting output shaft of said first right-angle gear box and to said upright input shaft of said cutterbar; said second header right-angle gear box further including a transverse output shaft projecting in said first direction; a multiple groove v-belt drive pulley being mounted to said transverse output shaft of said second header right-angle gear box; a third header gear box being located behind said second right-angle gear box and including an input shaft; a multiple groove v-belt driven pulley being mounted to said input shaft of said third header gear box; v-belt means being trained about said drive and driven pulleys; said third header gear box including an output shaft disposed parallel to said input shaft; drive and driven spur gears mounted to said input and outputs shafts of said third header gear box and meshed with each other; and upper and lower conditioner roll drive shafts respectively coupling said input and output shafts with said first and second support shafts.

13. The center-pivot mower-conditioner defined in claim 12 wherein a slip clutch means is mounted between said multiple v-groove driven pulley and said input shaft of said third header gear case.

* * * * *